May 13, 1969    D. D. MELIN ET AL    3,443,932
METALLURGICAL PROCESS AND APPARATUS
Filed Oct. 28, 1966    Sheet 1 of 2
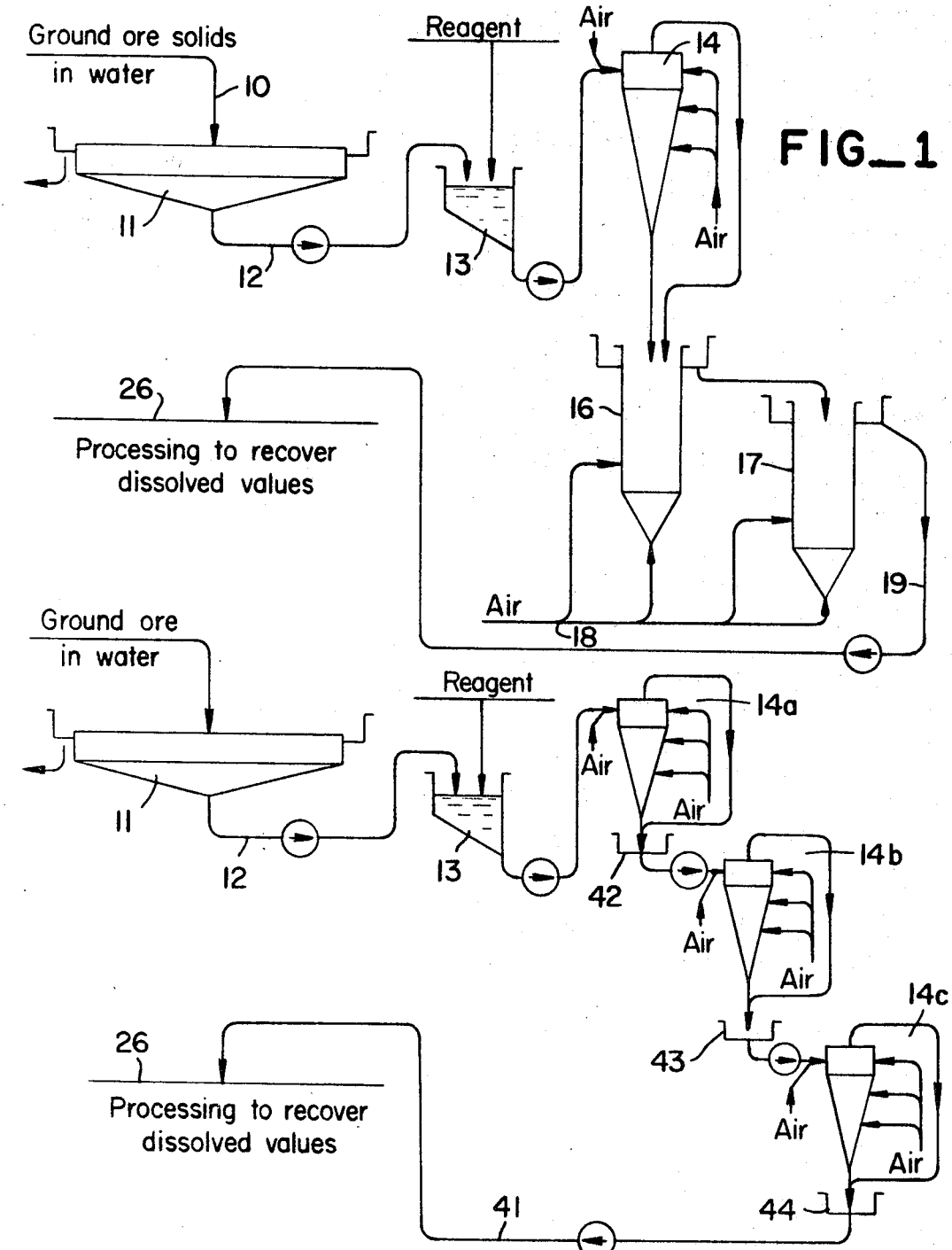
FIG_1
FIG_2
INVENTORS
DEERING D. MELIN
PETER C. WILSON
BY
ATTORNEYS

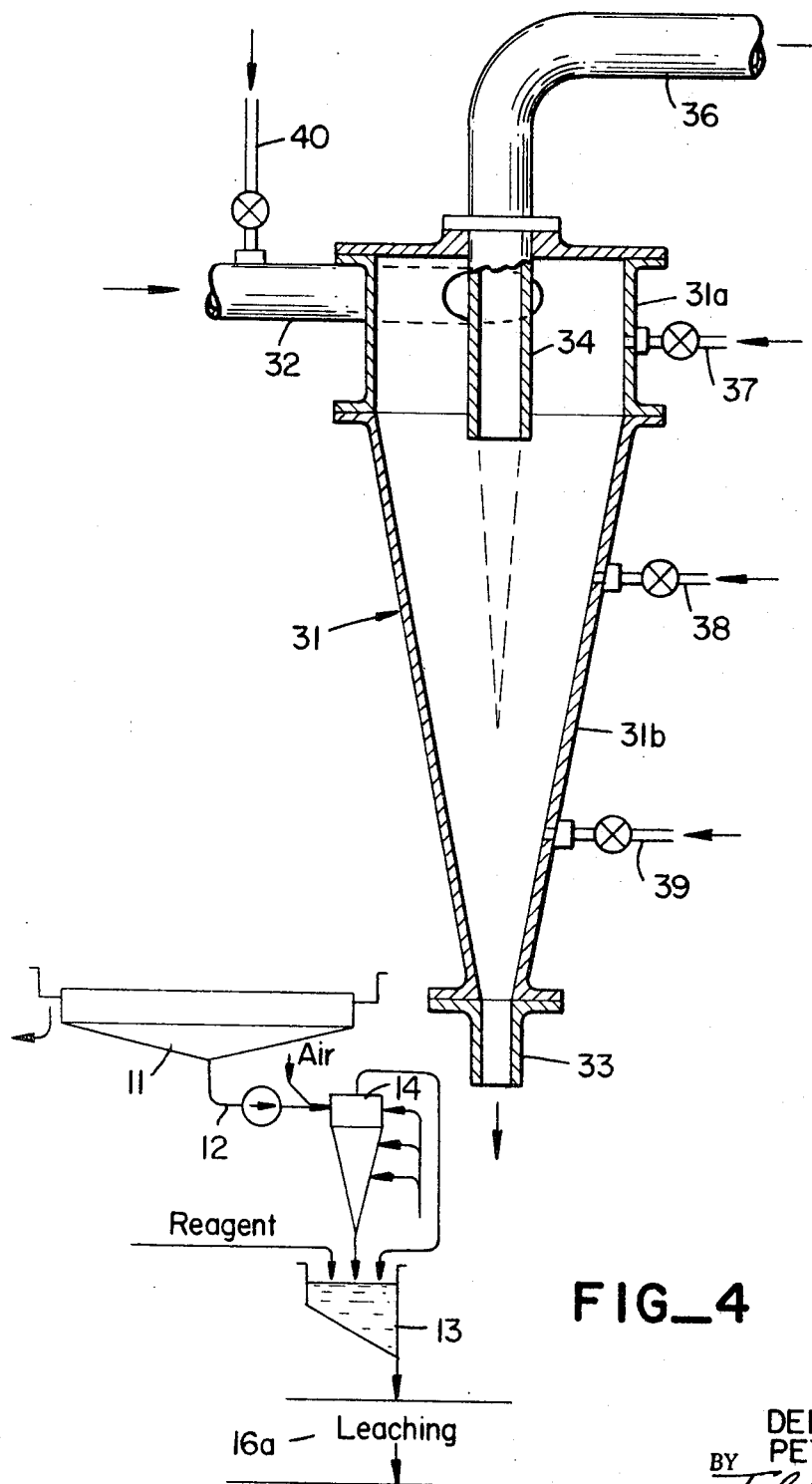

United States Patent Office 3,443,932
Patented May 13, 1969

3,443,932
METALLURGICAL PROCESS AND APPARATUS
Deering D. Melin, Palo Alto, Calif., and Peter C. Wilson, Evergreen, Colo., assignors to Krebs Engineers, Palo Alto, Calif., a corporation of California
Filed Oct. 28, 1966, Ser. No. 590,423
Int. Cl. C22b *3/00;* B01d *11/00;* B01f *1/00*
U.S. Cl. 75—101                              6 Claims The invention relates generally to processes for the recovery of metallurgical values from ore solids. It is applicable to a variety of ores where it is feasible to dissolve the values present in an aqueous chemical solution.

In many metallurgical processes it is common to produce a pulp consisting of divided ore solids and water. The pulp may be produced directly by wet grinding of the ore, or may be produced indirectly as a by-product of another metallurgical process. In any event the recovery of values from such a pulp generally involves introduction of a chemical reagent to produce a chemical solution capable of dissolving the values, after which the pulp is agitated in leaching tanks for dissolving a substantial part of the values. The leaching tanks may be agitated by mechanical means or by sparging air into the pulp. Thereafter the pulp is treated for recovery of the dissolved values. This may involve various procedures depending upon the character of the ore solids, the nature of the dissolving chemical, and the particular form of the values dissolved. By way of example the ore solids may be removed from the solution in one or more separating operations accompanied by washing, and then the values precipitated from the solution by use of a suitable precipitating agent.

Processes as described above are known to be subject to certain disadvantages. Particularly an extended period of time is required for treatment in the leaching tanks to effect the recovery required. The sparging of air or other gas into the pulp generally assists dissolution by oxygenation or gasification. With reference particularly to sparging with air, the oxygen in the air is not effectively contacted with the ore solids and solution in such a manner as to produce rapid and efficient oxygenation in a manner comparable to the present invention. Also such leaching tanks are relatively high (e.g., 45 to 50 feet high), and several of such tanks may be required for a given operation. Thus the leaching tanks occupy a relatively large space. An additional disadvantage is that in many instances it is not possible with the present methods to obtain a high yield of the dissolved values, and therefore there is considerable loss of values in the remaining ore solids.

In general it is an object of the present invention to provide a process of the above general character which greatly promotes dissolution of values in a metallurgical pulp.

Another object of the invention is to provide a metallurgical process of the above character which makes possible higher yields of the desired values.

Another object of the invention is to provide a process and apparatus of the above character which simplifies the equipment requirements and which in particular minimizes entirely or entirely dispenses with the conventional leaching tanks.

Additional objects and features of the invention will appear from the following description in which the preferred embodiments have been set forth in detail in conjunction with the accompanying drawing.

Referring to the drawing:

FIGURE 1 is a schematic diagram illustrating one embodiment of the invention;

FIGURE 2 is a schematic diagram illustrating another embodiment of the invention;

FIGURE 3 is a side elevational view in section showing apparatus for use in carrying out the invention; and FIGURE 4 is a schematic diagram illustrating another embodiment of the invention.

In accordance with the present invention a metallurgical pulp is provided, consisting of divided ore solids and water. After being incorporated with a dissolving reagent, this pulp, which now consists of dissolved ore solids and an aqueous solution, is pumped under pressure to a body of the same which is swirling about a central axis with relatively high velocity. Simultaneously air or other oxygen-containing gas under pressure is introduced into one or more peripheral regions of the swirling body, whereby the air is intimately dispersed and caused to progress from the outer periphery of the rotating body toward the central portion. Preferably the swirling body has a portion into which the pulp is introduced tangentially, and a portion which is conical shaped. Liquid is continuously removed from a central portion of the swirling body and is merged with solids removed from the apex of the conical portion. As will be presently explained this treatment effectively promotes rapid and effective dissolution of metallurgical values. After one stage of treatment as just described, the pulp may be treated in conventional leaching tanks, or the treatment described above may be repeated one or more times.

Referring to the process as illustrated in FIGURE 1, it is assumed ore is being wet ground as by some conventional milling process, to produce a mixture of ground ore solids in water. Such pulp is supplied by line 10 to the thickener 11 whereby the underflow 12 consists of a pulp of predetermined density. This thickened pulp is shown being pumped to the tank 13 where it is mixed with a suitable reagent. The particular reagent employed depends upon the character of the values to be removed, and the nature of the ore solids. By way of example sodium cyanide can be used as a reagent in the removal of gold, silver and like precious metal values. Sulphuric acid can be used in many instances, as for example with uranium and copper bearing ores.

The pulp from mixing tank 13, which now consists of ore solids together with an aqueous dissolving solution, is pumped under pressure to the device 14, where it is introduced into a body of the pulp swirling at relatively high speed, and where it is intermittently intermixed with dispersed oxygen-containing gas, such as air. After treatment in the device 14, the pulp, or fractions of the pulp, are delivered to the conventional leaching tanks 16 and 17.

As indicated, the contents of these leaching tanks are continuously sparged with air or other oxygen-containing gas introduced by way of line 18. Pulp discharging from tank 16 flows into leaching tank 17, and pulp discharging from this tank is delivered through line 19. Such pulp now consists of ore pulp solids from which metallurgical values have been removed, and a hydrous solution containing the dissolved values. Step 20 represents conventional treatment for the removal of the desired metallurgical values. By way of example, ore solids may be removed from the solution by methods involving settlement, centrifuging, decantation, filtration, and the like, together with washing of remaining solution from the solids, after which the solution is subjected to precipitation by the addition of a suitable precipitant, to remove the desired values.

The device 14 illustrated in FIGURE 3 may be substantially the same as a conventional hydrocyclone. The shell or chamber 31 consists of a substantially cylindrical portion 31a and a substantially conical shaped portion 31b. An inlet pipe 32 connects tangentially with the chamber portion 31a, and an outlet 33 is provided at the apex of the conical portion 31b. A pipe 34 in the form of a vortex finder extends axially into the chamber portion 31a, and has its exterior end connected with the pipe 36. The means provided for introducing air or other oxygen-containing gas into the swirling body of material within the chamber 31, may consist of a plurality of air pipes 37, 38 and 39, which are shown communicating through the wall of the shell. An additional air pipe 40 is shown connected to the inlet pipe 32.

The size of the shell 31 may vary in accordance with capacity requirements. In some instances the portion 31 of the shell may have an inside diameter of the order of from 6 to 20 inches, and the length of the tapered portion 31b may be of the order of from 10 to 45 inches. For higher capacity the portion 31a may range from 20 to 30 inches inside diameter, with the conical portion 31b extended accordingly. The pressure with which the pulp is delivered to pipe 32 may likewise vary in accordance with requirements and capacities. However, in general it is desirable to employ pressures which will obtain relatively intense swirling movement, as for example pressures of the order of 40 p.s.i. or higher.

Within the chamber 32 the swirling body of material is subjected to a variety of forces, including particularly relatively high centrifugal forces, and intense agitation and shear forces due to the fact that the material is being subjected to rapidly varying rotary velocities. Introduction of air under pressure into the inner peripheral regions of the swirling body, results in a breakup of the air or other gas into very fine bubbles, and these bubbles are diffused throughout the rotating body and progress inwardly from the outer periphery. Such diffused bubbles of gas are intimately associated with regions where intense agitation is taking place, and where the material has been subjected to intense agitation and shear forces. As a result oxygenation is promoted and accelerated, and this together with the conditions present which promote rapid and effective dissolution irrespective of oxygenation, greatly promotes and accelerates effective and efficient dissolution of values in the ore. Thus in general, the treatment just described results in more effective and efficient dissolution of values, a saving in time required, and simplification of any conventional leaching tanks employed.

The centrifugal forces to which the ore solids are subjected in the apparatus of FIGURE 3 results in a separating action whereby most or a substantial part of the ore solids discharge with some of the solution through the apex underflow outlet 33. The majority of the liquid, together with some of the finer ore solids, discharges through the pipe 36. As previously described in connection with FIGURE 1, these two draw-offs from the chamber 31, can be merged for further treatment in the leaching tanks 16 and 17.

In some instances it is desirable to eliminate the conventional leaching tanks 16 and 17, and to use instead a plurality of devices as shown in FIGURE 3. In this case a plurality of such devices (FIGURE 2) are used in cascade, and are designated 14a, 14b and 14c. Material discharging from device 14a is pumped into device 14b, and material discharging from this device is pumped into device 14c. The discharge from 14c is shown being delivered by line 41 to the processing 26 for recovering values from the solution. Tanks 42, 43 and 44 may be interposed on the inlet sides of the pumps which deliver material to devices 14b and 14c, and the pump for delivering material to the processing step 26 to permit the venting off of excess air.

It will be evident from the above that we have provided a process which can be used to advantage whenever it is desired to recover values from hydrometallurgical pulps where the values present are dissolved by chemical, oxygenation and/or gasification methods. As previously explained, chemical dissolution is augmented by virtue of the conditions present within the rotating body of pulp, irrespective of whether or not oxygenation takes place. Oxygenation is applicable in many instances, and as previously explained the oxygenation process has the effect of further augmenting or accelerating dissolution of the values. Our process greatly simplifies equipment requirements, and in many instances makes possible higher yields. As previously indicated a pulp being treated may consist of original ore solids which have been wet ground or it may be a fraction of the original ore solids which contain residual values. The pulp may also contain chemicals derived from preceding process operations. For example, the pulp may be slime tailings containing gold bearing solids together with a cyanide solution, or it may be a gold bearing cyanide leach residue. In connection with uranium ore processing, the pulp may be a leach residue bearing sulphuric acid. In connection with copper ore processing, the pulp may be a leach residue bearing copper sulphate and sulphuric acid, or copper hydroxide and caustic soda.

As an example of the invention, reference can be made to the recovery of gold from ore solids by cyanidation. It is known that the dissolution rate of gold in a cyanide solution is dependent upon the cyanide concentration, the oxygen concentration, and the concentration and chemical nature of the alkali used. The basic equation for dissolution of gold is as follows:

$$4Au + 8NaCN + 2H_2O + O_2 \rightarrow 4NaAu(CN)_2 + 4NaOH$$

In many operations, as for example in South Africa, calcium oxide (CaO) in the form of calcium hydroxide $(Ca(OH)_2)$ is used as protective alkali. The prime function of the calcium hydroxide during the leaching stages is to neutralize the acidity formed by the oxidation of pyrite and pyrrhotite. In addition, the calcium hydroxide prevents decomposition of the sodium cyanide by the inherent carbon dioxide of the air. The alkalinity of the pulp should be closely controlled consistent with optimum gold extraction efficiencies and minimum cyanide losses. For example, a pH of 10 or higher reduces the cyanide consumption but results in lower gold extraction efficiencies. Assuming application of the process to a gold bearing pulp, the thickened pulp may have a solids content of 55 to 65%. The solids of the pulp may assay 0.5 ounce gold per ton (dry basis). Such a pulp is then diluted with an alkali cyanide solution to produce a pulp having a solids concentration of 44 to 48%. In general, the sodium cyanide introduced into the pulp may be in such an amount as to provide about one to two pounds of sodium cyanide per ton of aqueous solution. This pulp is then pumped to the device shown in FIGURE 3 with a static inlet pressure of about 40 p.s.i. The cylindrical portion 31a may measure about 15 inches inside diameter, and the conical portion 31b about 31 inches long with an apex opening about 2 inches in diameter. The inlet pipe 32 and pipe 34 may have inside diameters of 4 and 6 inches respectively. Flow through the device will be at about 1000 U.S. gallons per minute. Air is supplied continuously as by means of the pipes 37, 38, 39 and 40 shown in FIGURE 3. The materials discharging through the apex outlet 33 and the outlet pipe 36 are merged together and supplied to the two leaching steps as shown in FIGURE 1. In the first leaching step the concentration of sodium cyanide (expressed as KCN) may be of the order of 0.028 to 0.30%. In the last leaching step the concentration of sodium cyanide (expressed as KCN) may be of the order of 0.016 to 0.022%. In the first leaching step the consumption of sodium cyanide may be of the order of 0.05 to 0.12 pound per ton of ore solids. For all leaching steps the consumption of sodium cyanide may be of the order of 0.20 to 0.28 pound per ton. In general, the cyanide consumption increases with an increase in cyanide solution strength. The lime consumption $(CaOH)_2$ in the leaching operations may be of the order of 0.107 to 0.22% (expressed as CaO) in the first step, and from 0.01 to 0.016% in the last step.

When the process is carried out without use of the device shown in FIGURE 3, retention times in two steps of leaching may vary from 15 to 45 hours to produce typical extraction efficiencies of from 94 to 97%. However, by use of the present method, which involves treatment of the pulp in the apparatus of FIGURE 3 before supplying it to the first leaching step (as in FIGURE 1), it is possible to reduce the retention times with sacrifice in efficiency of gold recovery. The reduction in leaching time may vary depending on such factors as the character of the ore solids and the extent to which the ore is oxygenated by the device of FIGURE 3. However, in general the savings in leaching time will be of the order of 25 to 50% or more.

In some instances the pulp may be oxygenated before reagent is introduced for dissolution of the desired values. Thus as illustrated in FIGURE 4, the thickener 11 delivers underflow to the pump which delivers the pulp under pressure to the device 14. In the device 14 the pulp is preconditioned by being oxygenated in the manner previously described, and the material discharging from this device is delivered to the mixing tank 13 where a reagent is introduced for dissolution of the desired values. Thereafter the pulp may be subjected to conventional leaching 16a and processing at 26 to recover the dissolved values. In this instance oxygenation preconditions the pulp for subsequent dissolution of values. Such a process may be desirable where the ore contains minerals such as pyrrhotite which decomposes on contact with cyanide solution and robs the solution of the oxygen required for dissolution of the gold.

We claim:

1. In a metallurgical process in which values are dissolved by contact of divided ore solids with an aqueous liquid solution, the steps of forming a pulp containing the divided ore solids and an aqueous solution comprising water and a chemical reagent, the solution being capable of dissolving metallurgical values in the ore solids, delivering the pulp under pressure to a confined swirling body of the same, whereby centrifugal and shear forces are developed within the swirling body, and continuously introducing an oxygen-containing gas into the periphery of said swirling body to promote dissolution of metallurgical values.

2. A process as in claim 1 in which solution is continuously removed from a central region of the body.

3. A process as in claim 1 in which the body consists of one portion into which the pulp is introduced tangentially and another conical shaped portion terminating in an apex, and in which solution is continuously removed from a central region of the swirling body and ore solids with some solution continuously move from the apex of the body.

4. In a metallurgical process in which values are dissolved by contact of divided ore solids with an aqueous liquid solution, the steps of forming a pulp containing the divided ore solids and an aqueous solution comprising water and a chemical reagent, the solution being capable of dissolving metallurgical values in the ore solids, delivering the pulp under pressure to a confined swirling body of the same whereby centrifugal and shear forces are developed within the body, continuously removing the pulp from said swirling body, delivering the pulp under pressure to another confined swirling body of the same whereby centrifugal and shear forces are developed, and continuously introducing oxygen-containing gas into the peripheries of both of said swirling bodies.

5. A process as in claim 4 in which both said swirling bodies consist of one cylindrical portion into which the pulp is introduced tangentially and another conical shaped portion terminating in an apex, liquid being continuously removed from a central portion of the first swirling body and merged with solids removed from the apex end of the body, thereby forming pulp for delivery to the second swirling body.

6. In a metallurgical process as in claim 5 in which the second swirling body likewise consists of one cylindrical portion into which the pulp is introduced tangentially and a conical shaped portion terminating in an apex, liquid being removed from a central portion of said second body and merged with solids delivered from the apex of the same.

References Cited
UNITED STATES PATENTS

| 775,509 | 11/1904 | Berrigan | 75—101 |
| 951,940 | 3/1910 | Crosse | 75—101 |
| 2,793,942 | 5/1957 | Clarke et al. | 23—271 |

L. DEWAYNE RUTLEDGE, Primary Examiner.

T. R. FRYE, Assistant Examiner.

U.S. Cl. X.R.

23—309